(12) United States Patent  (10) Patent No.: US 8,589,962 B2
Yamada  (45) Date of Patent: Nov. 19, 2013

(54) APPARATUS WITH OPENING AND CLOSING MECHANISM FOR PROPAGATING A DRIVING FORCE FROM A DRIVING SOURCE TO AN OPENING AND CLOSING BODY

(75) Inventor: Kazunari Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 148 days.

(21) Appl. No.: 13/145,440

(22) PCT Filed: May 28, 2009

(86) PCT No.: PCT/JP2009/002357
§ 371 (c)(1),
(2), (4) Date: Jul. 20, 2011

(87) PCT Pub. No.: WO2010/137075
PCT Pub. Date: Dec. 2, 2010

(65) Prior Publication Data
US 2011/0271592 A1    Nov. 10, 2011

(51) Int. Cl.
*G11B 33/02* (2006.01)
*G11B 17/04* (2006.01)

(52) U.S. Cl.
USPC .......................................... 720/647; 720/654

(58) Field of Classification Search
USPC ......... 720/600, 601, 645–647, 652–655, 657; 248/27.3; 361/679.01–679.61; 455/347–351
See application file for complete search history.

(56) References Cited

U.S. PATENT DOCUMENTS 7,046,586 B1 *   5/2006   Creager et al. .............. 369/30.28
2008/0180114 A1 *   7/2008   Fujiwara et al. .............. 324/663

FOREIGN PATENT DOCUMENTS

JP    2001-202766 A    7/2001
JP    2002-314266 A    10/2002
JP    2006-156480 A    6/2006

OTHER PUBLICATIONS

English translation of JP 2001-202766.*
English translation of JP 2006-156480.*

* cited by examiner

*Primary Examiner* — Nathan Danielsen
(74) *Attorney, Agent, or Firm* — Birch, Stewart, Kolasch & Birch, LLP

(57) ABSTRACT

An apparatus with opening and closing mechanism includes a control unit for making a foreign object detection time period during which a speed change resulting from a foreign object being caught is detected longer than a play detection time period during which a speed change resulting from a play factor of the driving force transmission system is detected within a predetermined operating range in a vicinity of each of a start point and an end point of an opening or closing operation. Therefore, the apparatus can discriminate between detection of a speed change resulting from a foreign object being caught, and detection of a speed change resulting from a play factor of the driving force transmission system which occurs in the vicinity of either of the start and end points of the opening or closing operation without erroneously detecting any one of them by using a single position sensor.

4 Claims, 8 Drawing Sheets

APPARATUS WITH OPENING AND CLOSING MECHANISM FOR PROPAGATING A DRIVING FORCE FROM A DRIVING SOURCE TO AN OPENING AND CLOSING BODY

FIELD OF THE INVENTION

The present invention relates to an apparatus with opening and closing mechanism for opening and closing an opening and closing body disposed on a surface of a housing, for example. More particularly, it relates to an apparatus with opening and closing mechanism for propagating a driving force from a driving source to an opening and closing body via gears.

BACKGROUND OF THE INVENTION

Conventionally, when a driving force is propagated to an opening and closing body via gears, like in the case of this type of apparatus with opening and closing mechanism, a speed change resulting from a play factor, such as a starting torque of a motor or a backlash of a gear (referred to as a play factor of a driving force transmission system from here on) is detected by using an intricate circuit, such as a current sensor. Furthermore, a speed change resulting from a finger, a foreign object or the like which is caught at the time of opening or closing the opening and closing body is detected by using a change of a detected value of a position sensor. Conventionally, detection of a speed change resulting from a play factor of the driving force transmission system and detection of a speed change resulting from a foreign object or the like being caught are carried out in this way by using different sensors.

Furthermore, patent reference 1 discloses a lid closing operation controlling method of detecting the position of a lid at a predetermined distance in front of a predetermined closed position of the lid, and carrying out a control operation of gradually decreasing a driving force for moving the lid while the lid is moving from this detected position to a movement completion position which is beyond the predetermined closed position by a predetermined distance to press the lid against an opening with a very small force is disclosed.

RELATED ART DOCUMENT

Patent Reference

Patent reference 1: JP, 2002-314266, A

SUMMARY OF THE INVENTION

However, because while the conventional apparatus with opening and closing mechanism detects a speed change resulting from a play factor of the driving force transmission system by using a current sensor, the conventional apparatus detects a speed change resulting from a foreign object or the like being caught by using a detected value of a position sensor, the conventional apparatus requires the two sensors and has complexity which needs a configuration of an intricate circuit and software control.

Furthermore, although it is necessary to shorten the detection time period of the position sensor for detecting a speed change resulting from a foreign object or the like being caught as much as possible in order to take the safety into consideration, a speed change resulting from a foreign object or the like being caught and a speed change resulting from a play factor of the driving force transmission system may be detected erroneously when a foreign object detection time period during which a speed change resulting from a foreign object or the like being caught is detected is decreased too much because a variation speed is low due to a play factor of the driving force transmission system while the opening and closing body is operating in the vicinity of either of the start and end points of the opening or closing operation.

Furthermore, in patent reference 1, although the control operation of gradually decreasing the driving force for moving the lid when the lid is at the last closed position is described, any descriptions about detection of a speed change resulting from a play factor of the driving force transmission system, and detection of a speed change resulting from a foreign object being caught are not presented at all.

The present invention is made in order to solve the above-mentioned conventional problem, and it is therefore an object of the present invention to provide an apparatus with opening and closing mechanism that uses a brief structure using only a single position sensor to be able to discriminate between detection of a speed change resulting from a foreign object being caught, and detection of a speed change resulting from a play factor of a driving force transmission system which occurs in the vicinity of either of start and end points of an opening or closing operation without erroneously detecting any one of them, and to be able to detect a foreign object being caught in a short time within a predetermined time period after the opening or closing operation is started.

An apparatus with opening and closing mechanism in accordance with the present invention makes a foreign object detection time period during which a speed change resulting from a foreign object being caught is detected longer than a play time period during which a speed change resulting from a play factor of a driving force transmission system is detected within a predetermined operating range in a vicinity of each of a start point and an end point of an opening or closing operation. The apparatus also makes the foreign object detection time period during which a speed change resulting from a foreign object being caught is detected shorter than the play time period during which a speed change resulting from a play factor of the driving force transmission system is detected within a predetermined time period after the opening or closing operation is started, and makes the foreign object detection time period during which a speed change resulting from a foreign object being caught is detected shorter than the play detection time period during which a speed change resulting from a play factor of the driving force transmission system is detected within a predetermined time period after the opening or closing operation is started.

According to the present invention, because the apparatus makes the foreign object detection time period during which a speed change resulting from a foreign object being caught is detected longer than the play time period during which a speed change resulting from a play factor of the driving force transmission system is detected within a predetermined operating range in a vicinity of each of a start point and an end point of the opening or closing operation, the apparatus can prevent erroneous detection of a speed change resulting from a foreign object being caught and detection of a speed change resulting from a play factor of the driving force transmission system which occurs in the vicinity of either of start and end points of the opening or closing operation. Because the apparatus also makes the foreign object detection time period during which a speed change resulting from a foreign object being caught is detected shorter than the play time period during which a speed change resulting from a play factor of the driving force transmission system is detected within a predetermined time period after the opening or closing operation is started, and makes the foreign object detection time period during which a speed change resulting from a foreign object being caught is detected shorter than the play detection time period during which a speed change resulting from a play factor of the driving force transmission system is detected within a predetermined time period after the opening or closing operation is started, the apparatus can improve the speed of detection of a foreign object being caught and can stop the opening or closing operation promptly at the time of occurrence of a foreign object being caught while giving priority to the user safety.

EMBODIMENTS OF THE INVENTION

Figure 1:
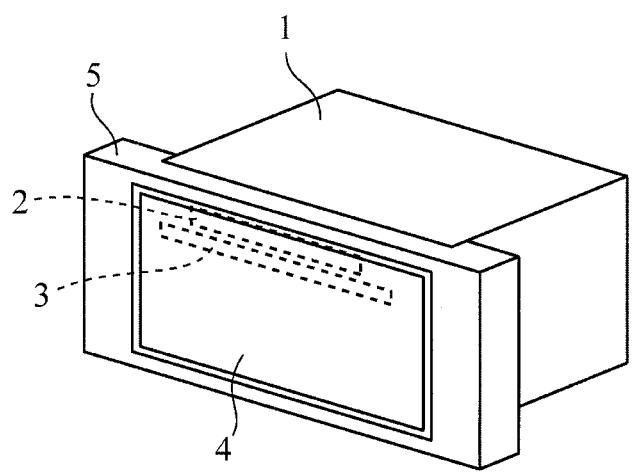
FIG. 1 is a perspective view showing the whole configuration of vehicle-mounted equipment equipped with an apparatus with opening and closing mechanism in accordance with the present invention in a state in which a display is closed.

Hereafter, in order to explain the present invention in a greater detail, embodiments of the present invention will be explained with reference to the accompanying drawings. FIGS. 1 to 6 show vehicle-mounted equipment equipped with an apparatus with opening and closing mechanism in accordance with the present invention. This vehicle-mounted equipment is provided with an equipment body disposed, as a housing, for accommodating a navigation device and a playback device for CD and DVD, and a display 4 attached to a front surface of this equipment body in such a way as to be able to be opened and closed, and disposed, as an opening and closing body, for enabling a CD or a DVD to be unmounted and mounted when the display is opened, and for covering unmounting and mounting openings 2 and 3 for CD and DVD when the display is closed.

The navigation device searches for a route to a destination position on the basis of a current position detected by a GPS "(Global Positioning system) registered trademark", and displays this searched route on the display 4 together with a map. The playback device for CD and DVD plays back an image stored in a DVD and displays this image on the display 4 while playing back a sound stored in a CD and outputs a sound from a speaker.

The equipment body 1 which accommodates the navigation device and the playback device for CD and DVD has the unmounting and mounting openings 2 and 3 for CD and DVD on the front surface thereof, and a frame 5 is disposed in such a way as to enclose a peripheral portion of the front surface and the display 4 is disposed in this frame 5 in such a way as to cover the front surface of the equipment body 1. This display 4 is attached to the equipment body 1 in such a way as to be able to be opened and closed by fitting pins 6 protruding from upper portions of both side surfaces of the display into guide grooves 7 formed in inner surfaces of both sides of the frame 5 and extending in upward and downward directions. Each of these guide grooves 7 has an upper half having a straight shape, and a lower half inclined toward a forward direction.

A U-shaped member 8 is attached to the equipment body 1 in such a way as to be able to slide in forward and backward directions by fitting guide grooves 9a and 9b formed in both leg elements 8a and 8b of the U-shaped member into pins 10a and 10b disposed on a bottom surface 1a of the equipment body 1. Furthermore, a motor 11 for driving the display 4 so as to open and close the display is disposed on the bottom surface 1a of the equipment body 1, and a pinion gear 13a among a gear series 13 which is engaged with a worm gear 12 disposed on a driving shaft of this motor 11 is engaged with a rack 14 formed on an internal surface of the leg element 8a and extending in forward and backward directions. Links 15 each of which is connected with a lower part of one of both the side surfaces of the display 4 are disposed on moving-side front portions of both the leg elements 8a and 8b of the U-shaped member 8.

Figure 2:
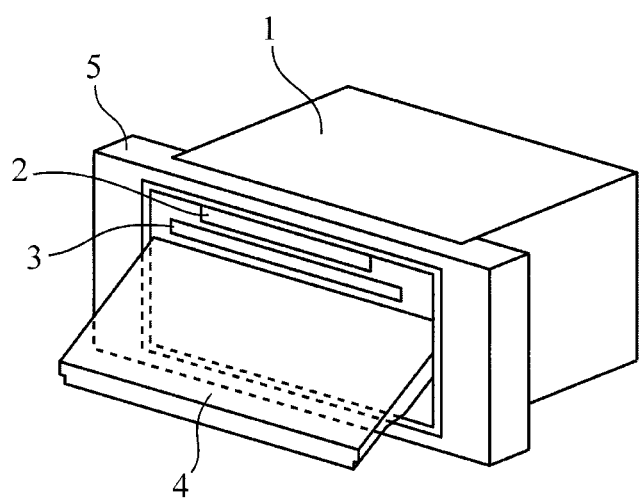
FIG. 2 is a perspective view showing the whole configuration of the vehicle-mounted equipment equipped with the apparatus with opening and closing mechanism in accordance with the present invention in a state in which a display is open.
Figure 3:
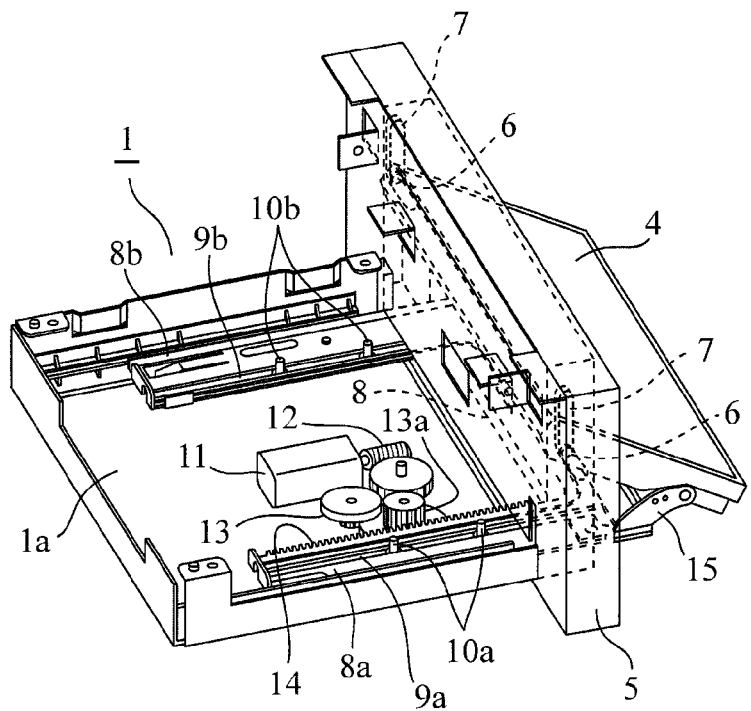
FIG. 3 is a perspective view showing an opening and closing mechanism for opening and closing the display in which a part of an equipment body is not shown.
Figure 4:
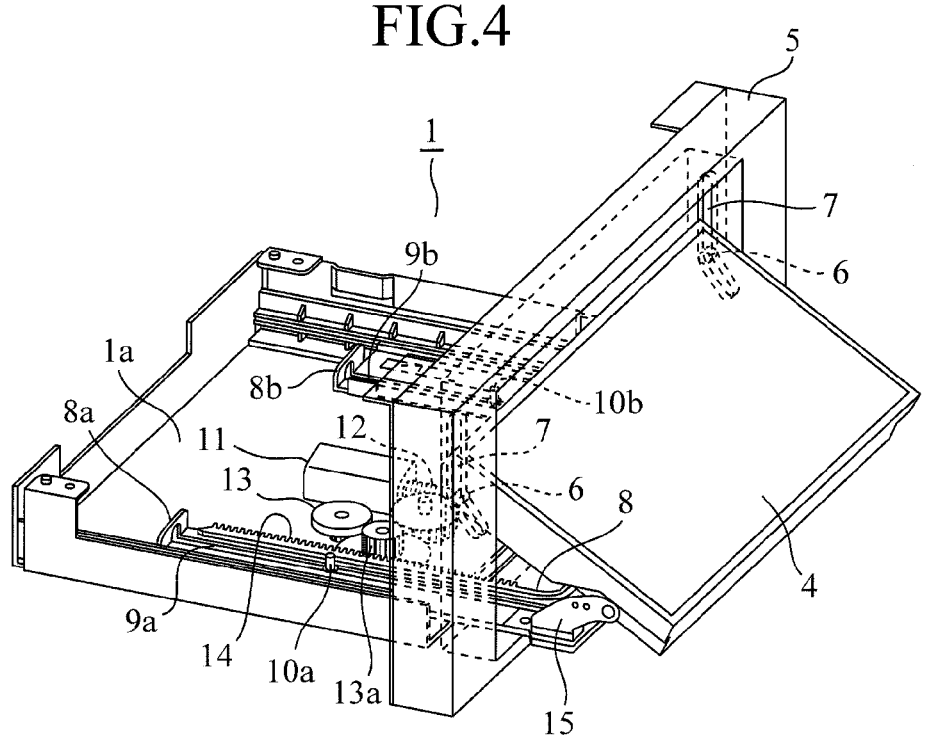
FIG. 4 is a perspective view showing the opening and closing mechanism from an angle different from that of FIG. 3.
Figure 5:
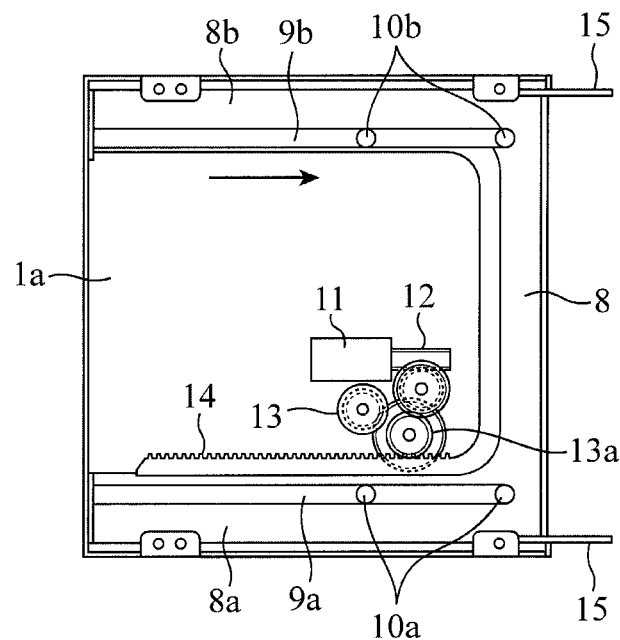
FIG. 5 is a plane view showing a state in which a driving unit of the opening and closing mechanism for opening and closing the display is positioned at a position where the display is closed.

Because the equipment body is constructed as above, in order to open the display 4 which is always in the closed state, the motor 11 is driven and the driving force of this motor is propagated to the U-shaped member 8 via the worm gear 12, the gear series 13, the pinion gear 13a and the rack 14 so that the U-shaped member 8 is moved in a direction shown by a solid arrow of FIG. 5. This movement of the U-shaped member 8 pushes the lower portion of the display 4 connected to the front portion of the U-shaped member 8 via the links 15 forwardly, and the upper portion of the display 4 descends along a straight line because of the engagement between the pins 6 and the guide grooves 7 and is opened with the display surface being inclined upward, as shown in FIGS. 2 to 4. Because when the display 4 is thus opened, the unmounting and mounting openings 2 and 3 for CD and DVD formed in the front surface of the body equipment 1 are exposed, an insertion or an exchange of a CD or a DVD can be performed in this state.

Figure 6:
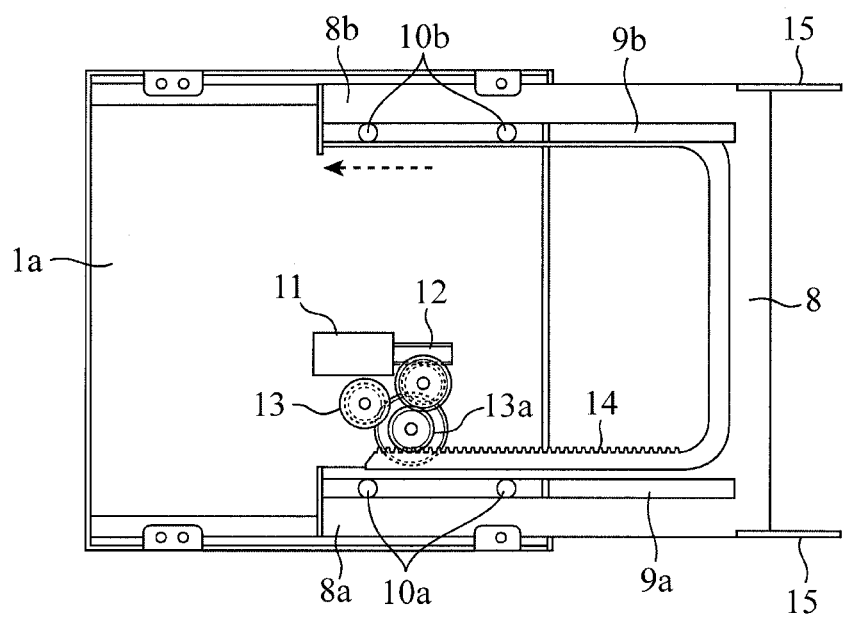
FIG. 6 is a plane view showing a state in which the driving unit of the opening and closing mechanism for opening and closing the display is positioned at a position where the display is open.

After an insertion or an exchange of a CD or a DVD is then completed, the motor 11 is driven in a direction reverse to the above-mentioned direction and this driving force is propagated to the U-shaped member 8 via the worm gear 12, the gear series 13, the pinion gear 13a and the rack 14 so that the U-shaped member 8 is moved in a direction opposite to the above-mentioned direction and shown by a dotted arrow of FIG. 6. Therefore, through a closing operation from the opened state shown in FIGS. 2 to 4, including a step of retracting the lower portion of the display 4 connected with the front portion of the U-shaped member 8 via the links 15 backward and a step of making the upper portion of the display 4 ascend along a straight shape because of the engagement between the pins 6 and the guide grooves 7, the display 4 is accommodated in the frame 5 to cover the front surface of the equipment body 1 with the front surface of the display being flush with the frame, as shown in FIG. 1.

Although the display 4 performs the opening and closing operations in the above-mentioned way, a foreign object may be in contact with the front surface of the lower portion of the display 4 when the display performs the opening operation, and a foreign object, such as a finger, may be caught between the display 4 and the frame 5 when the display performs the opening or closing operation, for example. Furthermore, a foreign object, such as a finger, may be similarly caught between the display 4 and the frame 5 when the display performs the closing operation, a speed change occurs during the operation in this case. On the other hand, when the display is in the vicinity of each of a start point and an end point of the opening or closing operation, a speed change occurs due to a play factor of the driving force transmission system.

In accordance with the present invention, in order to detect a speed change resulting from a foreign object being caught, and a speed change resulting from a play factor of the driving force transmission system, as mentioned above, by using a single position sensor, a foreign object detection time period during which a speed change resulting from a foreign object being caught is detected is made to be longer than a play time period during which a speed change resulting from a play factor of the driving force transmission system is detected within a predetermined operating range in the vicinity of each of the start and end points of the opening or closing operation.

Embodiment 1

Figure 7:
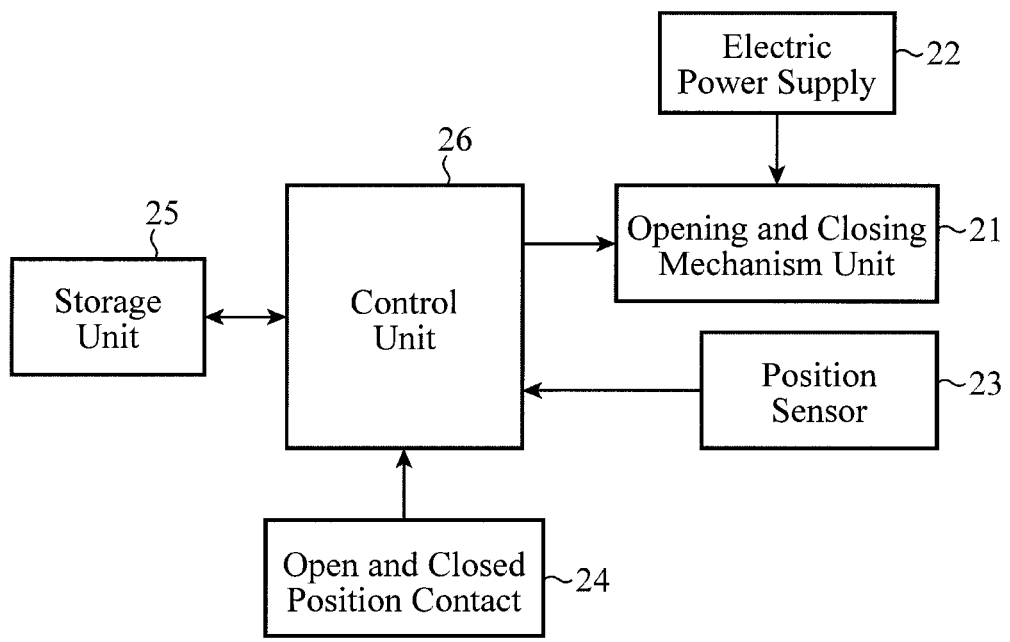
FIG. 7 is a block diagram showing a drive control circuit of an apparatus with opening and closing mechanism in accordance with Embodiment 1 of the present invention.

FIG. 7 is a block diagram showing a drive control circuit of an apparatus with opening and closing mechanism in accordance with Embodiment 1 of the present invention. The drive control circuit has an opening and closing mechanism unit 21, an electric power supply 22, a position sensor 23, an open and closed position contact 24, a storage unit 25, and a control unit 26. The opening and closing mechanism unit 21 consists of the U-shaped member 8, the motor 11, the gears (12, 13 and 13a), the rack 14, the links 16 which are shown in FIGS. 5 and 6, and so on. The electronic power supply 22 supplies electric power to the motor 11 included in the opening and closing mechanism unit 21. As the position sensor 23, a sliding resistance is used, for example. A moving terminal of this sliding resistance is attached to one gear shaft in the gear series 13, the resistance is changed by rotation of this gear shaft according to the open and closed state of the display 4, and a detected value according to the open and closed state of the display 4 is outputted. The open and closed position contact 24 detects an open or closed end position of the display 4 by using a switch (not shown).

The storage unit 25 stores time periods T1 and T2, a time period T3 longer than the time periods T1 and T2, and a time period T3' shorter than the time periods T1 and T2. The time period T1 is the one during which the detected value of the position sensor 23 does not vary immediately due to a play factor of the driving force transmission system while the display 4 is at the start point of the opening or closing of the display 4. The time period T2 is the one during which the detected value of the position sensor 23 does not vary by causing the display 4 to overrun beyond its actual open position, and also causing the gears to turn free because there is a necessity to cause the display 4 to be opened completely at the end point of the opening of the display 4. The time period T3 is the one during which the detected value of the position sensor 23 does not vary due to a foreign object being caught within the predetermined operating range in the vicinity of each of the start and end points of the opening or closing operation. The time period T3' is the one during which the detected value of the position sensor 23 does not vary due to a foreign object being caught within a predetermined time period after the opening or closing operation is started. The control unit 26 functions as a switching unit for controlling the opening and closing mechanism unit 21 to change the foreign object detection time period by using the predetermined time period of the opening or closing operation and the detected value of the position sensor on the basis of the pieces of information from the position sensor 23, the open and closed position contact 24, and the storage unit 25.

Figure 8:
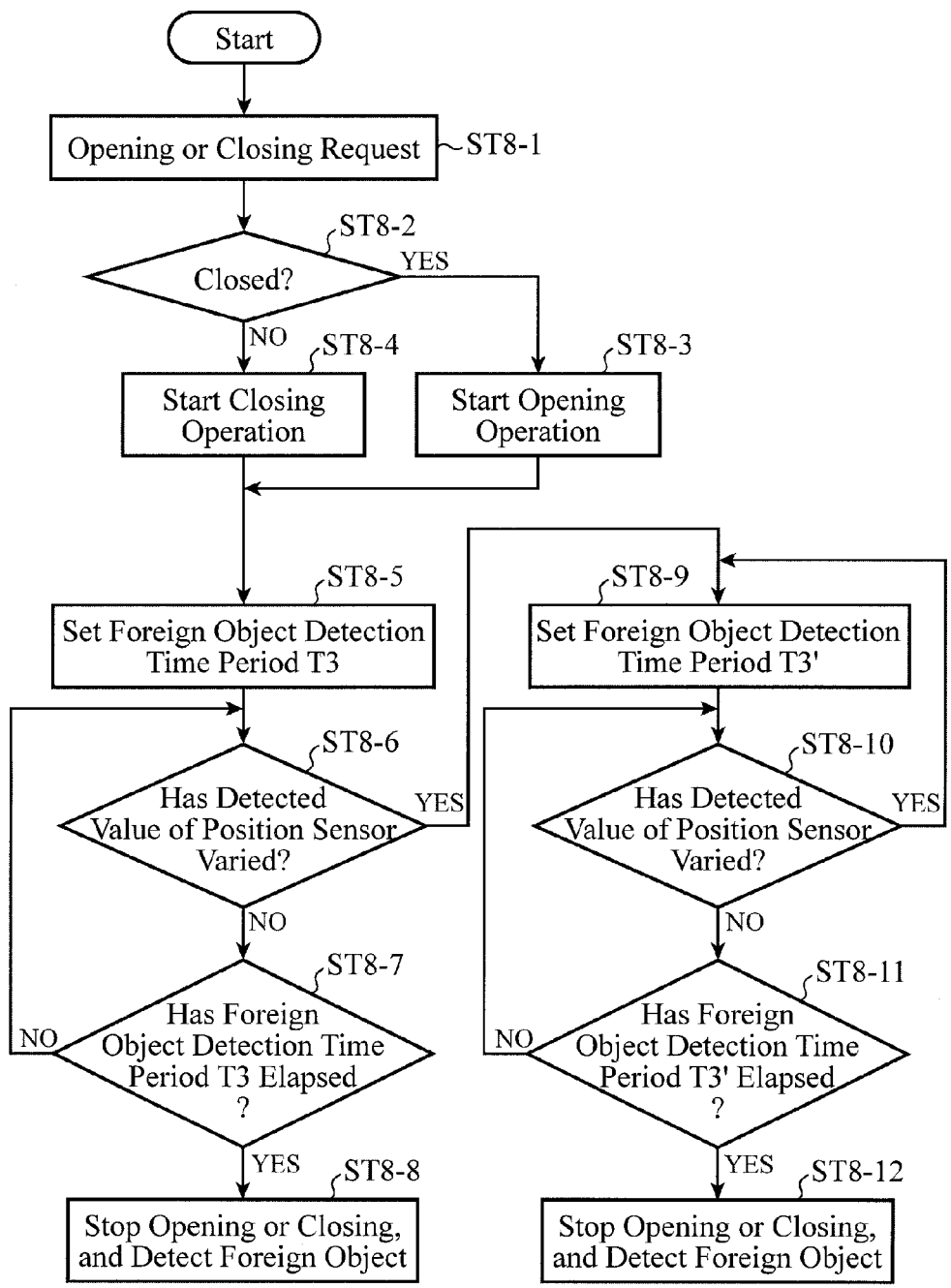
FIG. 8 is a flow chart explaining the operation of the apparatus with opening and closing mechanism in accordance with Embodiment 1 of the present invention.

Next, an operation of detecting a foreign object being caught at the time of the opening or closing operation of the display 4 will be explained with reference to a flow chart of FIG. 8, and a timing chart showing the open and closed state of the display 4 of FIG. 9. When a user makes a request of the control unit 26 to open or close the display 4 by using a not-shown operation unit (step ST8-1), the control unit 26 determines whether or not the display 4 is closed (step ST8-2), and, when determining YES, starts the opening operation of opening the display 4 (step ST8-3), whereas when determining NO, starts the closing operation (step ST8-4).

The control unit then sets the foreign object detection time period T3 by using the information read from the storage unit 25 even though either of the opening and closing operations is started (step ST8-5). After that, the control unit determines whether the detected value of the position sensor 23 has varied (step ST8-6), and, when determining NO, determines whether the foreign object detection time period T3 has elapsed (step ST8-7). When then determining NO, the control unit repeats this determining operation, whereas when determining YES, the control unit stops the opening or closing operation because it shows detection of a foreign object (step ST8-8).

In contrast, when the determination result of step ST8-6 is YES, the control unit sets the foreign object detection time period T3' by using the information read from the storage unit (step ST8-9). After that, the control unit determines whether the detected value of the position sensor 23 has varied (step ST8-10), and, when determining NO, determines whether the foreign object detection time period T3' has elapsed (step ST8-11). When then determining NO, the control unit repeats this determining operation, whereas when determining YES, the control unit stops the opening or closing operation because it shows detection of a foreign object (step ST8-12).

The control unit 26 always monitors the detected value of the position sensor 23. For example, after the opening operation is started, although the detected value of the position sensor 23 does not vary immediately due to a play factor of the driving force transmission system while the display is at the start point, the control unit 26 detects that a foreign object or the like has been caught during the detection time period T3 preset to the storage unit 25 when the detected value of the position sensor 23 does not vary even after the foreign object detection time period T3 has elapsed after a lapse of the play time period T1 caused by this play factor. At this time, T3>T1.

Figure 9:
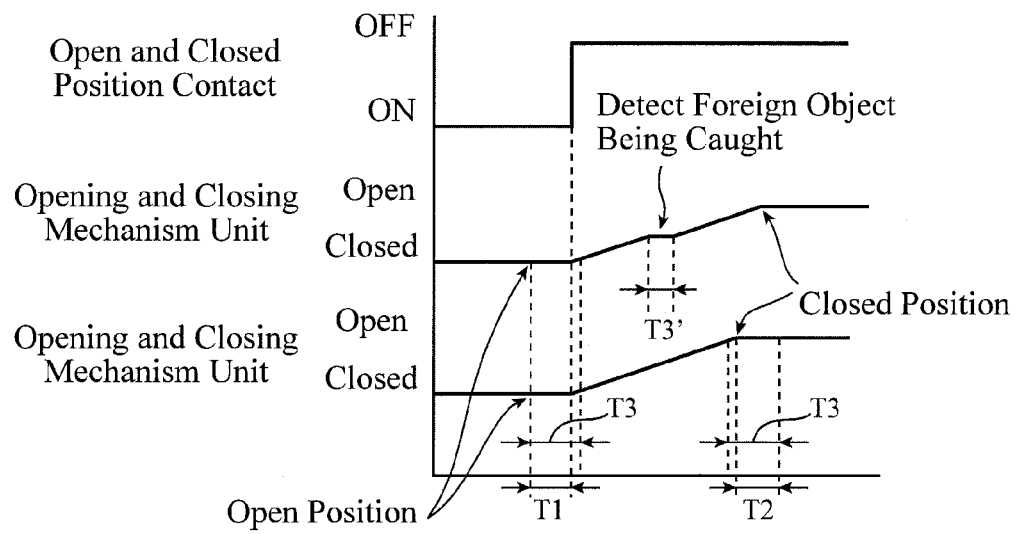
FIG. 9 is a timing chart showing the open and closed states of an opening and closing mechanism unit.

Furthermore, because the display has to be opened completely at the end point of the opening operation, the display is made to overrun beyond its actual open position, and the gears are made to turn free, as shown in FIG. 9. Therefore, also in this case, the control unit 26 detects that a foreign object or the like has been caught during the detection time period T3 preset to the storage unit 25 when the detected value of the position sensor 23 does not vary even after the foreign object detection time period T3 has elapsed after a lapse of the play time period T2 during which any speed change caused by the play factor is not detected. At this time, T3>T2.

Furthermore, because a variation speed of the position sensor 23 does not become low due to a play factor of the driving force transmission system within the predetermined time period after the opening operation has been started, the control unit 26 switches to the foreign object detection time period T3' preset to the storage unit 23, and quickly detects that a foreign object is caught. At this time, T3'<T3, and T3'<T1 and T2. Furthermore, because a backlash time period of the gears is added when a request to perform an inversion operation is made within the predetermined time period after this opening or closing operation has been started, the detection time period T3' of the position sensor is lengthened to T3 only within a fixed time period, like in the case in which the display is in the vicinity of either of the start and end points of the opening or closing operation so that erroneous detection of a speed change of the driving force transmission system which is caused by a speed change resulting from that a foreign object is caught can be prevented.

As mentioned above, in accordance with this Embodiment 1, because the foreign object detection time period T3 during which a speed change resulting from a foreign object being caught is detected is made to be longer than the play time periods T1 and T2 during each of which a speed change resulting from a play factor of the driving force transmission system is detected within a predetermined operating range in the vicinity of each of the start and end points of the opening or closing operation, erroneous detection of a speed change of the driving force transmission system which is caused by a speed change resulting from that a foreign object is caught can be prevented surely.

Furthermore, in accordance with the present invention, because the foreign object detection time period T3' during which a speed change resulting from a foreign object being caught is detected is made to be shorter than the play time periods T1 and T2 during each of which a speed change resulting from a play factor of the driving force transmission system is detected within a predetermined time period after the opening or closing operation has been started, thereby improving the response of detection of a foreign object being caught, priority is given to the user safety and the opening or closing operation can be stopped promptly when a foreign object is caught. In addition, because a backlash time period of the gears is added when a request to perform an inversion operation is made within the predetermined time period after this opening or closing operation has been started, the detection time period T3' of the position sensor is switched and lengthened to T3 only within a fixed time period, like in the case in which the display is in the vicinity of either of the start and end points of the opening or closing operation, erroneous detection of a speed change of the driving force transmission system which is caused by a speed change resulting from that a foreign object is caught can be prevented surely.

Embodiment 2

An apparatus with opening and closing mechanism in accordance with this Embodiment 2 is constructed in such a way as to, in order to switch between foreign object detection time periods T3 and T3', as shown in Embodiment 1, preset a detected value of a position sensor 23 in the vicinity of each of start and end points of an opening or closing operation to a control unit 26 or preset a time period during which the display is getting close to each of the start and end points of the opening or closing operation to the control unit 26.

Figure 10:
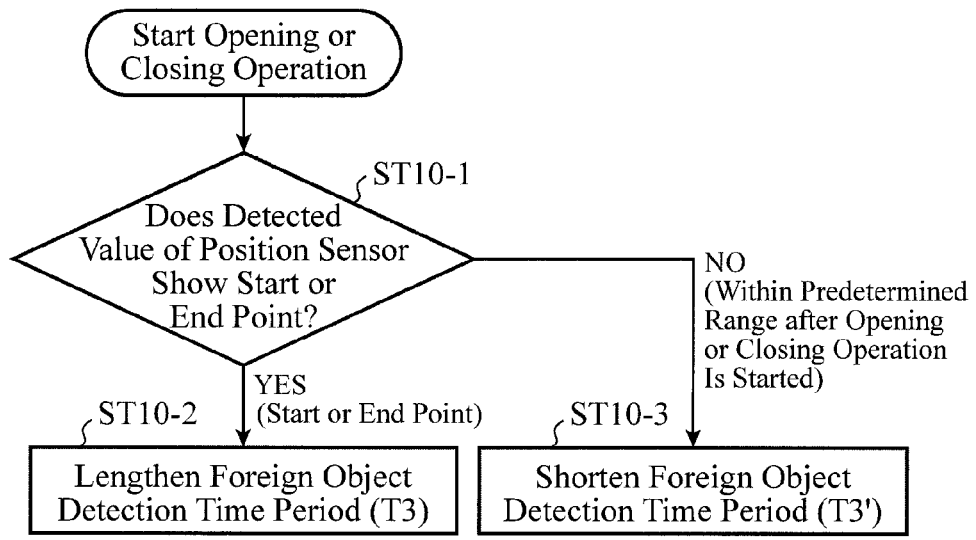
FIG. 10 is a flow chart for explaining the operation of an opening and closing mechanism unit in accordance with Embodiment 2 of the present invention at each of start and end points.

FIG. 10 is a flow chart in the case of presetting a detected value of the position sensor 23 in the vicinity of each of the start and end points of the opening or closing operation to the control unit 26 in order to switch between the foreign object detection time periods T3 and T3'. After the opening or closing operation is started, the control unit determines whether the detected value of the position sensor 23 shows that the display is in the vicinity of one of the start and end points of the opening or closing operation (step ST10-1), and, when determining YES, switches to T3 to lengthen the foreign object detection time period because the display is getting close to the vicinity of one of the start and end points of the opening or closing operation (step ST10-2), whereas when determining NO, the control unit switches to T3' to shorten the foreign object detection time period because the current time is within a predetermined time period after the opening or closing operation has been started (step ST10-3).

Figure 11:
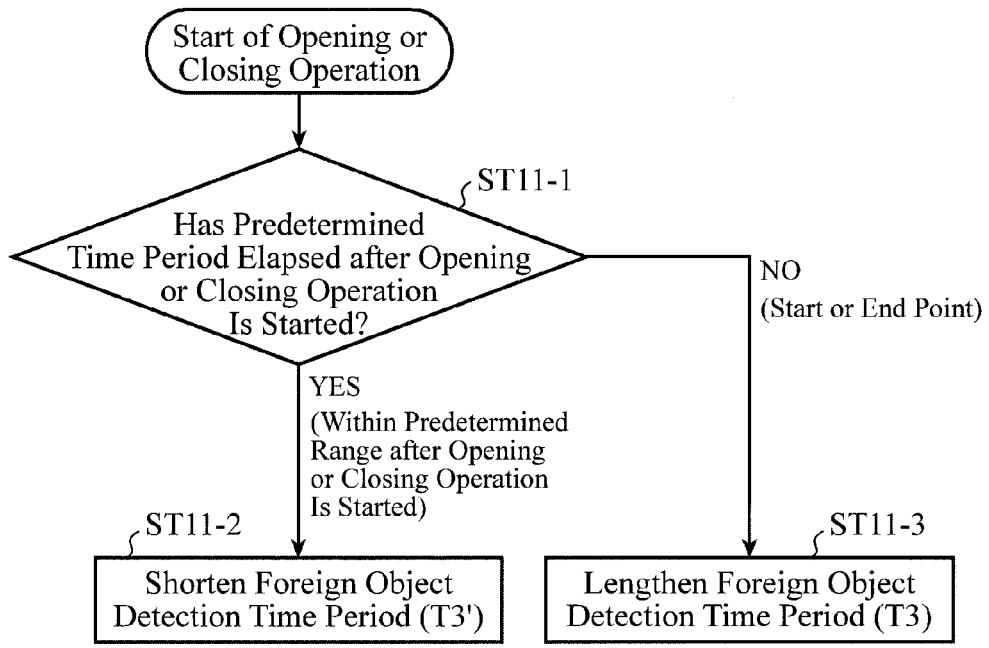
FIG. 11 is a flow chart explaining the operation of the opening and closing mechanism unit in accordance with Embodiment 2 of the present invention when a predetermined time period elapses after an opening or closing operation is started.

FIG. 11 is a flow chart in the case of presetting a time period during which the display is getting close to each of the start and endpoints of the opening or closing operation to the control unit 26 in order to switch between the foreign object detection time periods T3 and T3'. After the opening or closing operation is started, the control unit determines whether a predetermined time period has elapsed after the opening or closing operation has been started (step ST11-1), and, when determining YES, switches to T3' to shorten the foreign object detection time period because the current time is within the predetermined time period after the opening or closing operation has been started (step ST11-2), whereas when determining NO, the control unit switches to T3 to lengthen the foreign object detection time period because the display is getting close to the vicinity of one of the start and end points of the opening or closing operation (step ST11-3).

As mentioned above, because the apparatus with opening and closing mechanism in accordance with Embodiment 2 switches between the foreign object detection time periods T3 and T3' according to the detected value of the position sensor in the vicinity of each the start and end points of the opening or closing operation, and whether or not the current time is within a time period during which the display is getting close to one of the start and end points of the opening or closing operation, the apparatus sets the foreign object detection time period T3 to be longer than the play time periods T1 and T2 caused by a play factor of the driving force transmission system in the vicinity of either of the start and end points of the opening or closing operation, thereby preventing erroneous detection from occurring, and, when recognizing that the display is within another operating range, can surely implement switching to the foreign object detection time period T3' which is shorter than the foreign object detection time period T3.

Embodiment 3

Figure 12:
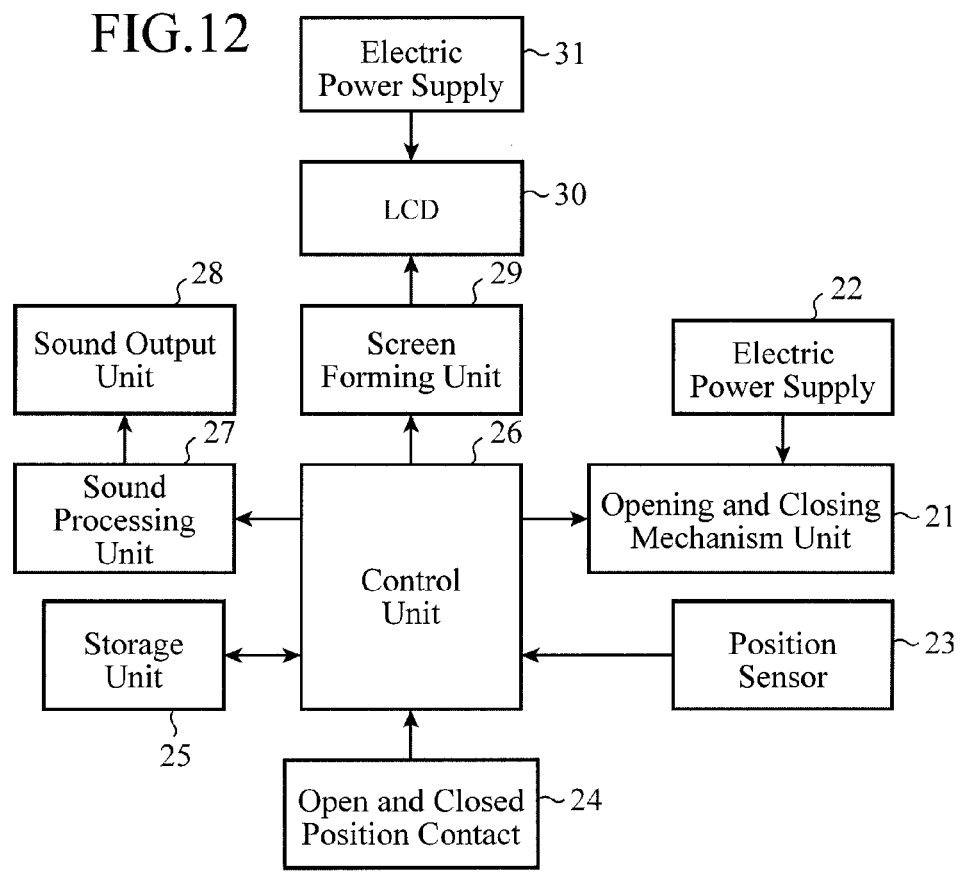
FIG. 12 is a block diagram showing a drive control circuit of an apparatus with opening and closing mechanism in accordance with Embodiment 3 of the present invention.

FIG. 12 is a block diagram showing Embodiment 3 of the present invention, and a sound output unit 28, such as a speaker, is connected to a sound processing unit 27 controlled by a control unit 26, and an image forming unit 29 for forming an image according to an output from the control unit 26, and a display unit 30, such as an LCD, for displaying the image formed by this image forming unit 29 are added to the structure shown in the block diagram of Embodiment 1. An electric power supply 31 for exclusive use is connected to the display unit 30. In this case, the sound output unit 28 and the display unit 30 form a notification unit for notifying information to a user.

According to this Embodiment 3, when the control unit 26 detects that a foreign object is caught on the basis of a detected value from a position sensor 23, the control unit controls a sound output for calling the user's attention by means of a buzzer or the like using the sound processing unit 27, and displays a telop signal which is prepared in advance on the display unit 30, thereby being able to exactly call the user's attention to the foreign object being caught.

Embodiment 4

Figure 13:
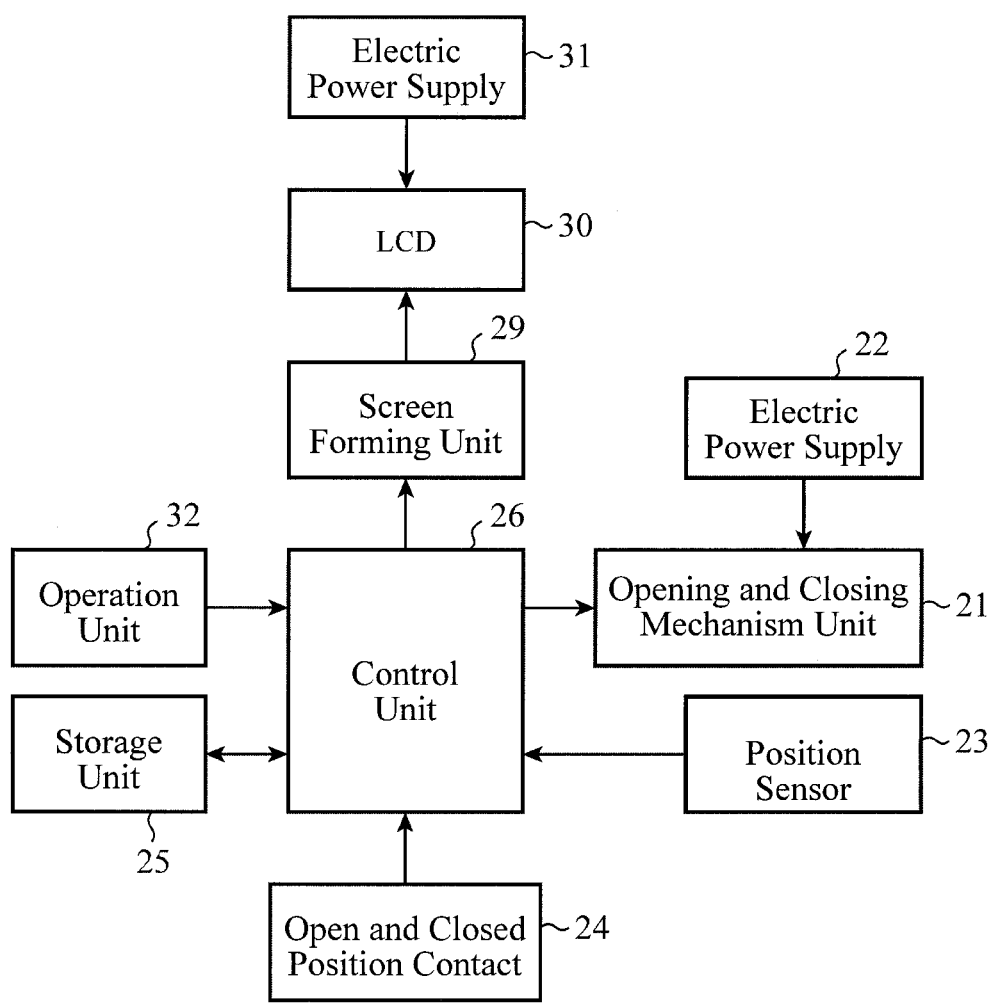
FIG. 13 is a block diagram showing a drive control circuit of an apparatus with opening and closing mechanism in accordance with Embodiment 4 of the present invention.

FIG. 13 is a block diagram showing Embodiment 3 of the present invention, and an operation unit 32 for inputting a required command to a control unit 26 is disposed instead of the sound processing unit 27 and the sound output unit 28 in the structure shown in the block diagram of Embodiment 2. The apparatus is constructed in such a way as to enable the control unit 26 to arbitrarily set which one of the following processes: a process of stopping an opening or closing operation, an opening process, and a closing process should be carried out when detecting that a foreign object is caught.

According to this Embodiment 4, because the control unit 26 can present a selection screen of the control unit 26 at the time of detecting a foreign object for a user by using a display unit 30, the user can operate the control unit 26 by using the operation unit 32 to select one of the process of stopping the opening or closing operation, the opening process, and the closing process and make the control unit hold the information selected thereby in a storage unit 25. As a result, when detecting a foreign object, the control unit 26 carries out a control operation with the process selected by the user, among the process of stopping the opening or closing operation, the opening process, the closing process, and so on, by using the stored information read from the storage unit 25.

Although vehicle-mounted equipment equipped with a display disposed, as an opening and closing body, on a surface of a housing is disclosed as the apparatus with opening and closing mechanism in accordance with the present invention, the present invention can be similarly applied to any equipment other than this vehicle-mounted equipment, like equipment having an opening and closing body in which a driving force from a driving source is propagated to the opening and closing body via gears to open and close this opening and closing body.

INDUSTRIAL APPLICABILITY

As mentioned above, the apparatus with opening and closing mechanism in accordance with the present invention can be applied to equipment having an opening and closing body, for example, vehicle-mounted equipment having a display disposed, as an opening and closing body, on a surface of the equipment as a housing, in which the display is opened and closed in order to allow a user to perform an insertion or exchange of a CD, a DVD, or the like into the equipment.

The invention claimed is:

1. An apparatus comprising:
   an opening and closing mechanism equipped with a housing having an opening and closing body disposed therein;
   a driving force transmission system for propagating a driving force from a driving source disposed in said housing to said opening and closing body via gears to perform an opening or closing operation;
   a position sensor for detecting a variance in position of said opening and closing body; and
   a control unit programmed to determine whether a speed change of the opening or closing operation is caused by a foreign object being caught or by a play factor of said driving force transmission system by:
      during a first predetermined time period commencing at the start of said opening or closing operation and during a second predetermined time period in the vicinity of an end point of said opening or closing operation, determining that a foreign object is caught when said position sensor has not detected a variance in said position of said opening and closing body during making a foreign object detection time period which is longer than a play detection time period, said play detection time period being a time period during which an absence of detection of a variance in said position of said opening and closing body is attributed to the play factor of said driving force transmission system, and
      after the first predetermined time period has expired but before the second predetermined time period has commenced, determining that a foreign object is caught when said position sensor has not detected a variance in said position of said opening and closing body during a foreign object detection time period which is shorter than said play detection time period.

2. The apparatus with opening and closing mechanism according to claim 1, wherein the apparatus has a switching unit for changing the foreign object detection time period according to a predetermined time period of the opening or closing operation and a detected value of a position sensor.

3. The apparatus with opening and closing mechanism according to claim 1, wherein the apparatus has a notification unit for calling a user's attention by providing a sound or a display when it is detected that a foreign object is caught.

4. The apparatus with opening and closing mechanism according to claim 1, wherein the apparatus has an operation unit for enabling a user to arbitrarily perform a setting which causes the apparatus to stop the opening or closing operation, open the opening and closing body, or close the opening and closing body when it is detected that a foreign object is caught.

* * * * *